(12) United States Patent
Yang et al.

(10) Patent No.: US 7,885,210 B2
(45) Date of Patent: Feb. 8, 2011

(54) ACCOUNTING FOR MAP PARSING DELAY TO ENABLE COEXISTENCE OF MULTIPLE RADIOS

(75) Inventors: Xue Yang, Portland, OR (US);
Xiangying Yang, Portland, OR (US);
Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 11/824,310

(22) Filed: Jun. 29, 2007

(65) Prior Publication Data
US 2009/0003293 A1    Jan. 1, 2009

(51) Int. Cl.
*H04B 7/005* (2006.01)
*H04Q 7/24* (2006.01)
(52) U.S. Cl. ...................... 370/278; 370/338
(58) Field of Classification Search ................ 370/277, 370/278, 282, 328, 338
See application file for complete search history.

(56) References Cited

U.S. PATENT DOCUMENTS

| 7,567,528 | B2* | 7/2009 | Naghian et al. | 370/328 |
|---|---|---|---|---|
| 2005/0201325 | A1* | 9/2005 | Kang et al. | 370/328 |
| 2006/0088008 | A1* | 4/2006 | Kim | 370/336 |
| 2006/0193286 | A1* | 8/2006 | Naghian et al. | 370/328 |
| 2007/0058577 | A1* | 3/2007 | Rubin | 370/328 |
| 2008/0144612 | A1* | 6/2008 | Honkasalo et al. | 370/370 |
| 2009/0135755 | A1* | 5/2009 | Qi et al. | 370/311 |

* cited by examiner

*Primary Examiner*—Hong Cho
(74) *Attorney, Agent, or Firm*—Ryder, Lu, Mazzeo and Konieczny, LLC; Douglas J. Ryder

(57) ABSTRACT

In general, in one aspect, the disclosure describes an apparatus that includes a first radio to communicate with a first wireless network and a second radio to communicate with a second wireless network. The first wireless network transmits a map defining locations within an assigned spectrum data is to be communicated therebetween. An earliest possible location defined in map is such that the map can be parsed within the time it would take to get to the earliest possible location so that the radio can be turned off after receiving the map until the location defined in the map, and the second radio is active when the first radio is not.

18 Claims, 4 Drawing Sheets

ACCOUNTING FOR MAP PARSING DELAY TO ENABLE COEXISTENCE OF MULTIPLE RADIOS

BACKGROUND

The desire for wireless communications continues to increase and accordingly the number and type of wireless networks (e.g., wireless local area network (WLAN), wireless metropolitan area networks (WMAN), wireless personal area networks (WPAN)) available for wireless communications continues to increase. In order for mobile devices (e.g., laptop computers, handheld devices) to provide wireless communications there is a need for the devices to accommodate several different wireless network types (network models). In order to support multiple wireless networks, the mobile devices may include a cluster of different radios for communicating over the various network types (referred to as the Multi-Radio coexistence Platforms (MRP)).

The various radios may operate in overlapping or adjacent frequency bands and possibly suffer from interference when they operate at overlapping time instants due to, for example, physical proximity and radio power leakage.

BRIEF DESCRIPTION OF THE DRAWINGS

The features and advantages of the various embodiments will become apparent from the following detailed description in which.

DETAILED DESCRIPTION

A Multi-Radio coexistence Platforms (MRP) mobile device, such as a cellular phone, may include multiple wireless interfaces for communicating with multiple different wireless networks. For example, the MRP may include some combination of wireless local area network (WLAN) radio, wireless metropolitan area network (WMAN) radio, and wireless personal area network (WPAN) radio. The WMAN network may be compliant with the IEEE standard 802.16.x (WiMAX) and the WLAN network may be compliant with IEEE standard 802.11.x (WiFi). In order to reduce MRP interference between the radios for the various wireless networks, a time-division multiplexing (TDM) based mechanism can be used to make different radios active at different times.

Figure 1:
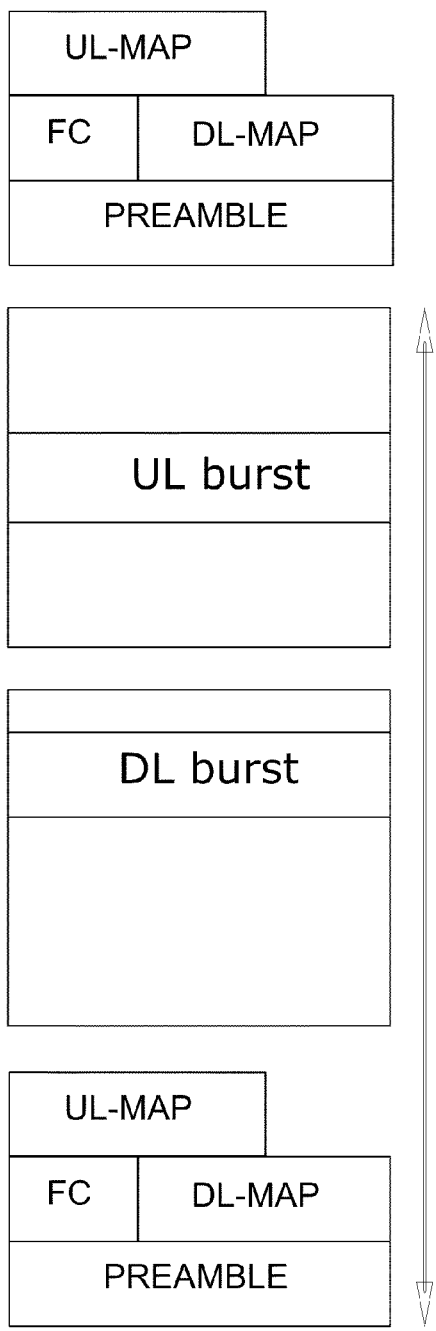
FIG. 1 illustrates a conceptual WiMAX frame structure, according to one embodiment.

FIG. 1 illustrates the conceptual WiMAX frame structure based on random tone permutation, for which the WiMAX radio physically occupies a set of tones randomly selected from the whole band. The header includes a preamble, frame control (FC), downlink map (DL-MAP) and uplink map (UL-MAP). The DL-MAP and UL-MAP define the portions of the frame utilized for receiving data from base station (DL bursts) and transmitting data to the base station (UL burst) respectively.

Figure 2:
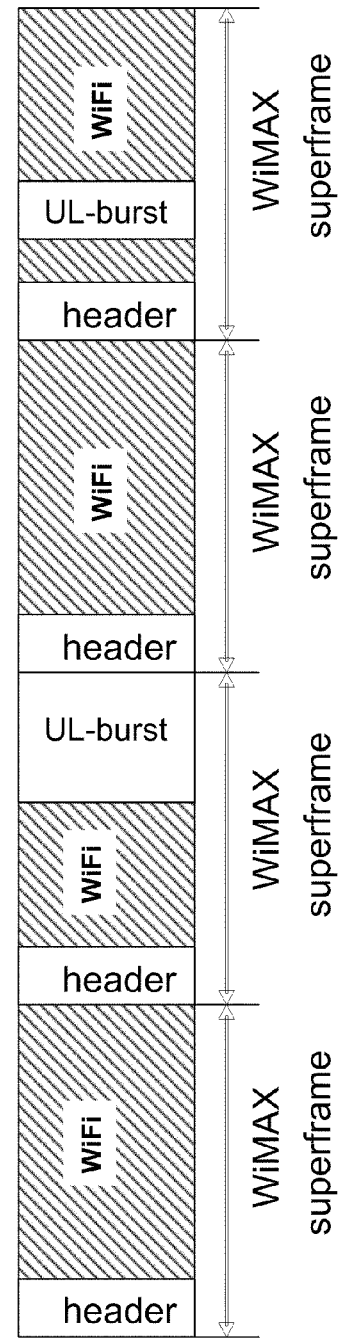
FIG. 2 illustrates an example WiMAX superframe with WiFi and WiMAX time-division multiplexed, according to one embodiment.

FIG. 2 illustrates an example of how WiFi and WiMAX may co-exist on an MRP based on time-division multiplexing. The MRP WiMAX radio at the MRP listens to WiMAX base station during each header duration. Once the WiMAX radio processes the DL-MAP and UL-MAP and understands the DL-burst and UL-burst timing it only needs to be active during these durations. The WiFi radio can be active during the rest of the time.

Figure 3:
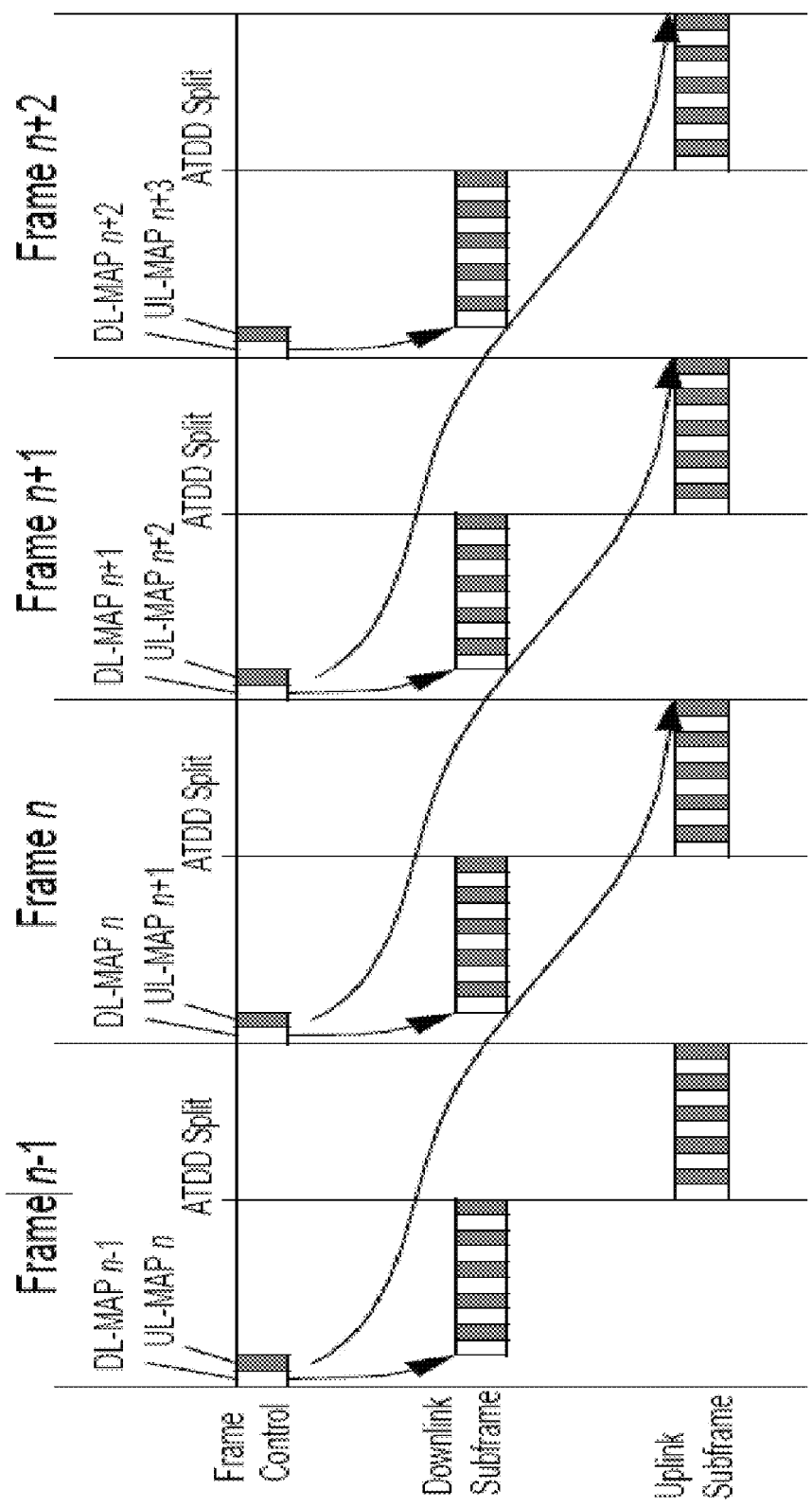
FIG. 3 illustrates example relations between DL-MAP/UL-MAP and DL-bursts and UL bursts defined thereby, according to one embodiment.

FIG. 3 illustrates example relations between DL-MAP/UL-MAP and DL-bursts and UL bursts defined thereby for a typical WiMAX frame. The WiMAX frame includes a DL portion followed by an UL portion as defined by the FC. The DL-MAP describes DL-bursts in a current frame (frame in which DL-map is received) and DL sub-frame immediately follows the MAP info. The DL-MAP is in effect describing what immediately follows. The UL-MAP describes UL-bursts in a next frame (frame after UL-map is received) and the UL sub-frame follows the DL sub-frame. The UL-MAP is in effect describing what happens in 1½ frame (this complete frame plus next DL sub-frame).

Since the DL sub-frame with which the DL burst will occur immediately follows the WiMAX header (DL-MAP), ideally the WiMAX radio can understand its scheduled DL-burst durations as soon as the WiMAX header ends. However, in reality a delay (possibly substantial) is often associated with the WiMAX MAP parsing and, consequently, the WiMAX radio cannot know the locations of its scheduled DL-burst immediately at the end of WiMAX header. Therefore, the WiMAX radio has to listen to all DL-bursts until the MAP parsing is completed. If the MAP parsing delay is significant the WiMAX radio may remain active for an excessive amount of time leaving little time left for other co-located radios to operate.

Reversing the sequence of DL sub-frame and UL sub-frame within the WiMAX superframe (the UL sub-frame follows the WiMAX header and the DL sub-frame follows UL sub-frame) would provide a time gap with which map parsing could occur. The time gap would be equal to the length of UL sub-frame between the DL-MAP and the start of the DL sub-frame. When such time gap is longer than the MAP parsing delay, the MRP WiMAX radio will know exactly when its DL-burst is scheduled before the DL sub-frame starts. Accordingly, the WiMAX radio does not need to listen to other DL-bursts other than its own, and the negative impact of large MAP parsing delay on MRP is eliminated.

Figure 4:
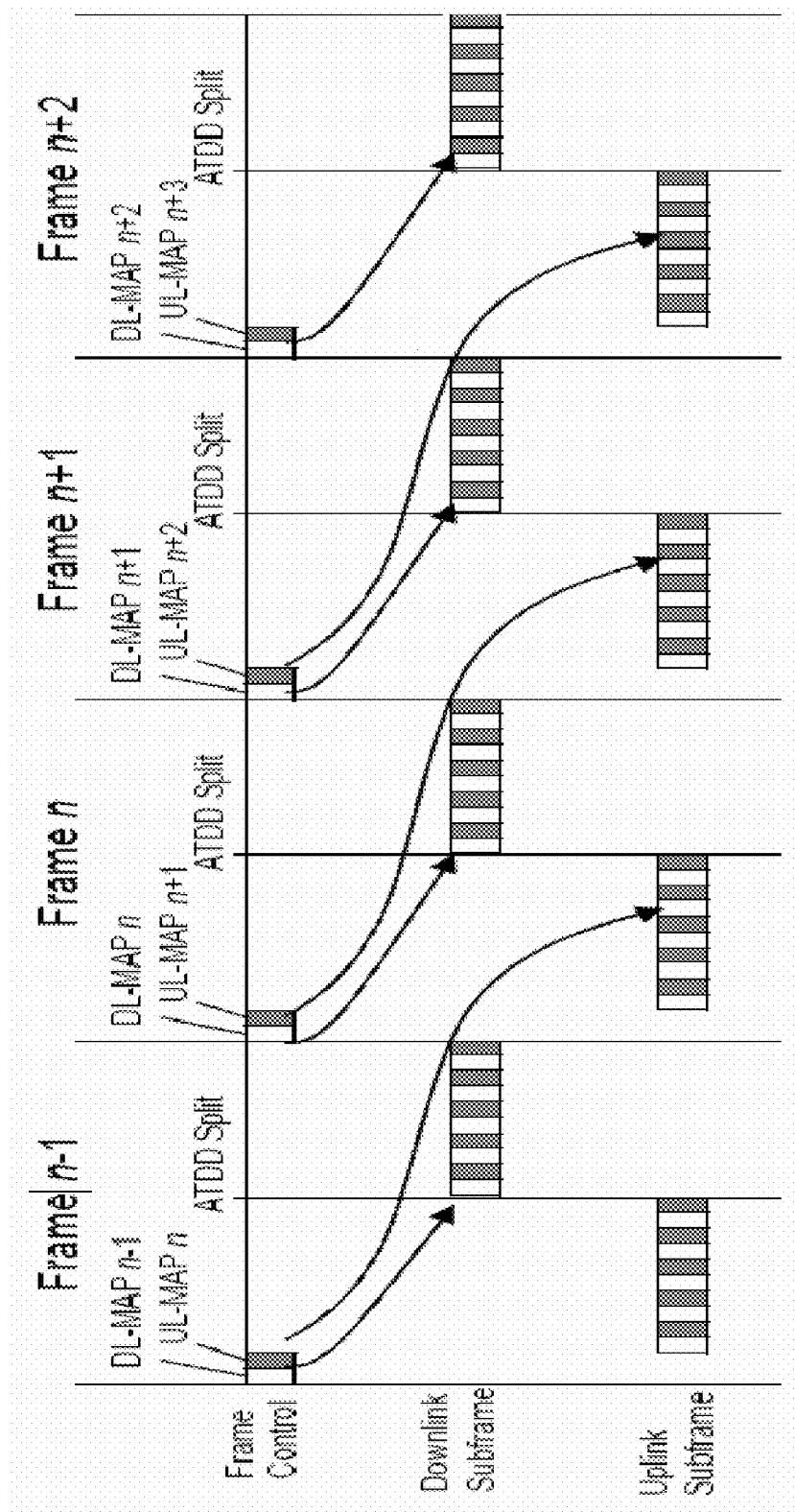
FIG. 4 illustrates example relations between DL-MAP/UL-MAP and DL-bursts and UL bursts defined thereby, according to one embodiment.

FIG. 4 illustrates example relations between DL-MAP/UL-MAP and DL-bursts and UL bursts defined thereby. The WiMAX frame includes an UL portion followed by a DL portion as defined by the FC (UL/DL sub-frames are reversed from FIG. 3). The DL-MAP still defines DL bursts in the current frame and the UL-MAP still defines UL-burst in the next frame. The DL-MAP is in effect describing what happens in the second half of the current frame (after UL sub-frame) and the UL-MAP is in effect describing what happens in the next frame (immediately after next frames header).

This method requires the structure of the WiMAX frame to be modified and introduces a delay in the receipt of DL bursts equal to the gap (length of the UL-subframe). For example, if the WiMAX superframe size is 5 ms and the DL/UL ratio is 1:1 then the delay would be 2.5 ms.

Rather than modifying the WiMAX frame to provide a gap for map parsing to occur the DL map can be modified to define the DL burst in the next frame instead of the current frame. The time gap would be fixed at a length equal to the length of a WiMAX superframe (e.g., 5 ms). Since the time gap is longer than the MAP parsing delay, the MRP WiMAX radio will know exactly when its DL-burst is scheduled before the DL sub-frame starts. Accordingly, the WiMAX radio does not need to listen to other DL-bursts other than its own, and the negative impact of large MAP parsing delay on MRP is eliminated.

Figure 5:
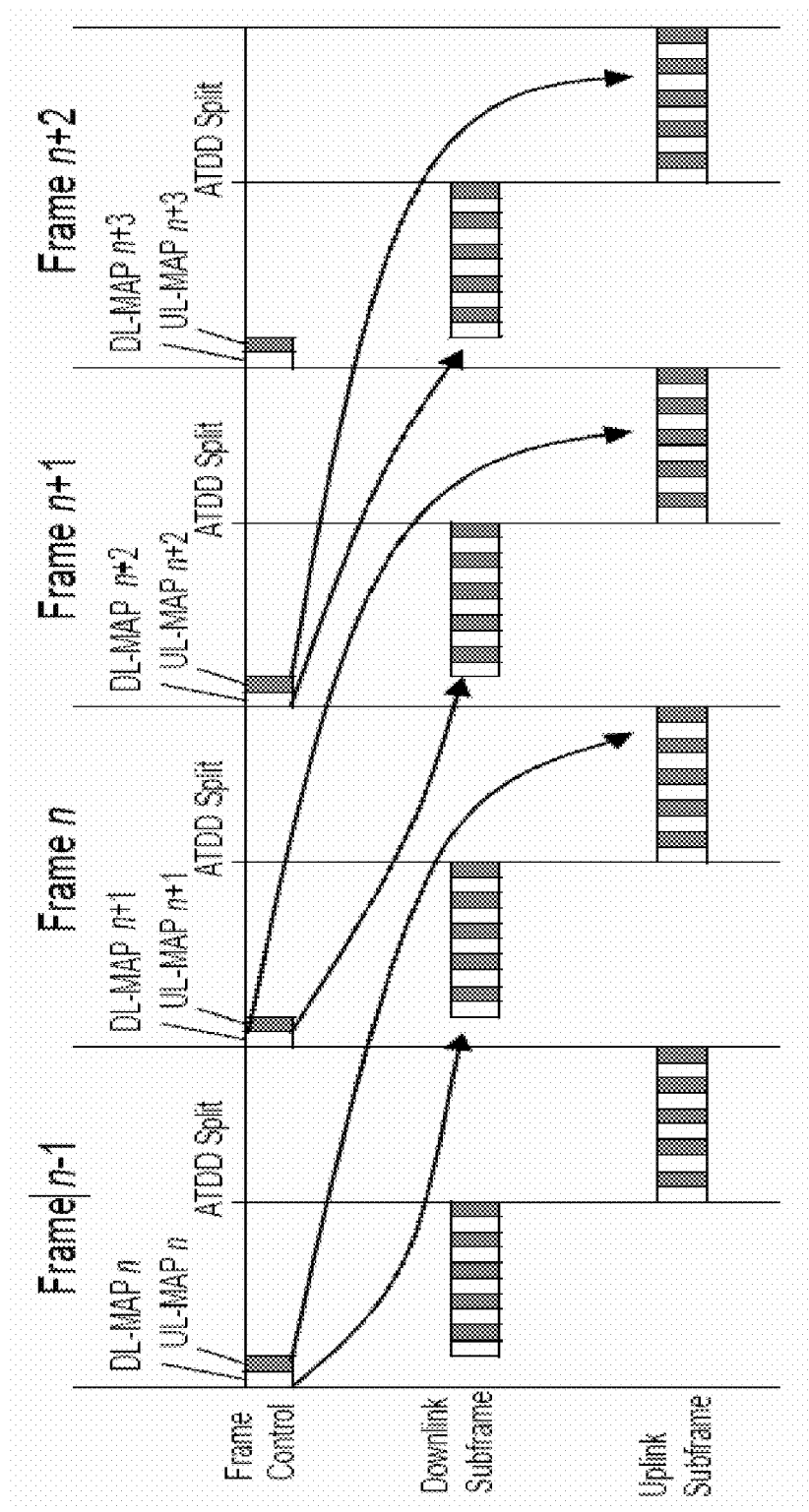
FIG. 5 illustrates example relations between DL-MAP/UL-MAP and DL-bursts and UL bursts defined thereby, according to one embodiment.

FIG. 5 illustrates example relations between DL-MAP/UL-MAP and DL-bursts and UL bursts defined thereby. Both the DL-MAP and the UL-MAP describe the DL bursts and the UL bursts respectively that occur in the next frame. The DL-MAP is in effect describing what happens in the next frame (in the DL sub frame immediately after next frames header). The UL-MAP describes UL-bursts that happen in the UL sub-frame after the next DL sub-frame. The UL-MAP still is in effect describing what happens in 1½ frame.

The implementations defined in FIGS. 4 and 5 delayed expected receipt of WiMAX data to account for map parsing delays in order to avoid the WiMAX radio from hogging radio time from the WiFi radio during the map parsing time. The implementations result in a delay in receipt of communications from the WiMAX base station so that throughput degradation might result. However, without using the proposed methods, WiMAX may not be able to efficiently operate concurrently with the WiFi radios on the MRP, in the presence of large MAP parsing delay. The proposed methods can be implemented as supplemental features of WiMAX radios and the features may be turned on only when there is need for multi-radio co-existence.

The implementations discussed above were discussed with specific reference to eliminating the effect of map parsing delay on a WiMAX radio to provide a coexisting WiFi radio additional bandwidth. The implementation is not limited to coexisting WiFi radios but may be any type of coexisting radio (e.g., WLAN, WPAN). In addition, the techniques for handling map parsing delays made specific reference to WiMAX radios but are not limited thereto. Rather, the techniques could be applicable to other radios where the header includes a map defining where within an assigned spectrum data is to be communicated (received and/or transmitted).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising:
a first radio to communicate with a first wireless network via frames, wherein the frames include headers, downlink sub-frames, and uplink sub-frames, wherein the preambles are to include maps from the first wireless network that define portions of the downlink sub-frames where data is to be received from the first wireless network and portions of the uplink sub-frames where data is to be transmitted to the first wireless network, wherein the first radio is to be active during the preambles, the downlink sub-frames if the defined portions of the downlink sub-frames have not yet been parsed from the associated maps, the defined portions of the downlink sub-frames if the defined portions of the downlink sub-frames have been parsed from the associated maps, and the defined portions of the uplink sub-frames, wherein the first radio is to be inactive otherwise, and wherein each map is to define a portion of an associated downlink sub-frame having an earliest possible location such that the map can be parsed within the time it would take to get to the earliest possible location so that the first radio can be inactive for all but the defined portion of the associated downlink sub-frame; and
a second radio to communicate with a second wireless network, wherein the second radio is active when the first radio is inactive.

2. The apparatus of claim 1, wherein the downlink sub-frame follows the uplink sub-frame within the frames, wherein the uplink sub-frame provides sufficient time for the map to be parsed, and wherein the earliest possible location is within the downlink sub-frame of a current frame.

3. The apparatus of claim 2, wherein each map is to define the portion of the uplink sub-frame in a next frame.

4. The apparatus of claim 1, wherein the earliest possible location is within the downlink sub-frame of a next frame.

5. The apparatus of claim 4, wherein each map is to define the portion of the uplink sub-frame in a next frame.

6. The apparatus of claim 1, wherein the first radio is a WiMAX radio.

7. A system comprising:
a WiMAX base station;
a first WiMAX radio to communicate with the WiMAX base station using a first configuration of WiMAX frames;
a multi radio device (MRD) including a second WiMAX radio and an additional radio, wherein the second WiMAX radio is to communicate with the WiMAX base station using a second configuration of WiMAX frames, wherein the second configuration of WiMAX frames include a downlink (DL) map that relates to a DL sub-frame that is delayed from the DL map by at least a map parsing time to enable the second WiMAX radio to be inactive during map parsing.

8. The system of claim 7, wherein the first configuration of WiMAX frames include a DL sub-frame followed by an uplink (UL) sub-frame, a DL map defines a DL burst in a current frame, and a UL map defines a UL burst in a next frame.

9. The system of claim 8, wherein the second configuration of WiMAX frames include an UL sub-frame followed by the DL sub-frame, the DL map defines a DL burst in a current frame, and a UL map defines a UL burst in a next frame.

10. The system of claim 8, wherein the second configuration of WiMAX frames include the DL sub-frame followed by an UL sub-frame, the DL map defines a DL burst in a next frame, and a UL map defines a UL burst in the next frame.

11. The system of claim 7, wherein the second WiMAX radio is to be active during a portion of the DL sub-frame defined in the DL map as receiving data from the WiMAX base station and inactive for all but the defined portion of the DL sub-frame.

12. The system of claim 11, wherein the additional radio is to communicate with an additional wireless network, wherein the additional radio is active when the second WiMAX radio is inactive.

13. A multi-radio mobile device comprising:
a wireless metropolitan area network (WMAN) radio to communicate with a WMAN using WMAN frames, wherein the WMAN frames include preambles, downlink sub-frames, and uplink sub-frames, wherein the preambles include downlink maps that relate to downlink sub-frames that are delayed from the downlink maps by at least a map parsing time to enable the WMAN radio to be inactive during map parsing; and a wireless local area network (WLAN) radio to communicate with a WLAN, wherein the WLAN radio is active when the WMAN radio is inactive.

14. The device of claim 13, wherein the WMAN frames include the uplink sub-frame followed by the downlink sub-frame, and wherein the downlink map defines a downlink burst in the downlink sub-frame of a current frame.

15. The device of claim 13, wherein the WMAN frames include the downlink sub-frame followed by the uplink sub-frame, and wherein the downlink map defines a downlink burst in the downlink sub-frame of a next frame.

16. The device of claim 13, wherein the WMAN radio is to be active during a portion of the downlink sub-frame defined in the downlink map as receiving data from the WMAN and inactive for other portions of the downlink sub-frame.

17. The device of claim 13, wherein the WMAN preambles include uplink maps to define an uplink burst in the uplink sub-frame of a next frame, and wherein the WMAN radio is to be active during a portion of the uplink sub-frame defined in the uplink map as the uplink burst and inactive for other portions of the uplink sub-frame.

18. The device of claim 13, wherein the WMAN preambles include uplink maps to define uplink bursts in the uplink sub-frames, wherein the downlink maps are to define downlink bursts in the downlink sub-frames, wherein the WMAN radio is to be active during the preambles, the portions of the downlink sub-frames defined in the downlink maps as the downlink bursts, and the portions of the uplink sub-frames defined in the uplink maps as the uplink bursts, and wherein the WMAN radio is to be inactive otherwise.

* * * * *